United States Patent [19]

Bunch et al.

[11] Patent Number: 4,657,729

[45] Date of Patent: Apr. 14, 1987

[54] SOLID TAGS FOR IDENTIFYING FAILED REACTOR COMPONENTS

[75] Inventors: Wilbur L. Bunch; Robert E. Schenter, both of Richland, Wash.

[73] Assignee: The United States of America as represented by the United States Department of Energy, Washington, D.C.

[21] Appl. No.: 622,299

[22] Filed: Jun. 19, 1984

[51] Int. Cl.$^4$ .................... G21C 17/00; G21C 3/10
[52] U.S. Cl. .................... 376/251; 376/253; 376/450
[58] Field of Search .............. 376/250, 251, 253, 450

[56] References Cited

U.S. PATENT DOCUMENTS

| | | | |
|---|---|---|---|
| 3,663,363 | 5/1972 | Crouthamel et al. | 376/251 |
| 4,033,813 | 7/1977 | Holt et al. | 376/250 |
| 4,259,152 | 3/1981 | Pennell et al. | 376/250 |
| 4,302,295 | 11/1981 | Shimada | 376/450 |
| 4,312,707 | 1/1982 | Miyazawa | 376/450 |
| 4,447,388 | 5/1984 | Sutton, Jr. | 376/245 |
| 4,495,141 | 1/1985 | Ozaki | 376/450 |
| 4,495,143 | 1/1985 | Gross et al. | 376/251 |

FOREIGN PATENT DOCUMENTS 989393  4/1965  United Kingdom ................ 376/450

OTHER PUBLICATIONS

N. J. McCormick et al., "Gas Tag Identification of Failed Fuel—I. Synergistic Use of Inert Gases", *Nuclear Technology*, vol. 24, Nov. 1974, pp. 149–155.

N. J. McCormick, "Gas Tag Identification of Failed Fuel—II. Resolution Between Single and Multiple Failures", *Nuclear Technology*, vol. 24, Nov. 1974, pp. 156–167.

N. J. McCormick et al, "Gas Tag Identification of Failed Reactor Assemblies—III. Tag Ratios for the Fast Flux Text Facility Cores I through IV", *Nuclear Technology*, vol. 29, May 1976, pp. 200–208.

J. A. Figg et al., "Gas Tag Identification of Failed Reactor Assemblies—IV. Analysis Methods", *Nuclear Technology*, vol. 50, Mid-Aug. 1980, pp. 16–24.

C. A. Strand et al, "Design and Manufacture of Gas Tags for FFTF Fuel and Control Assemblies", *Nuclear Technology*, vol. 26, Aug. 1975, pp. 472–479.

J. D. B. Lambert et al, "Recent Improvements in Identifying Fission Product Sources in the Experimental Breeder Reactor II", *Nuclear Technology*, vol. 39, Aug. 1978, pp. 275–277.

*Primary Examiner*—Salvatore Cangialosi
*Attorney, Agent, or Firm*—R. D. Fuerle

[57] ABSTRACT

A solid tag material which generates stable detectable, identifiable, and measurable isotopic gases on exposure to a neutron flux to be placed in a nuclear reactor component, particularly a fuel element, in order to identify the reactor component in event of its failure. Several tag materials consisting of salts which generate a multiplicity of gaseous isotopes in predetermined ratios are used to identify different reactor components.

18 Claims, No Drawings

SOLID TAGS FOR IDENTIFYING FAILED REACTOR COMPONENTS

STATEMENT OF GOVERNMENT INTEREST

This invention was either first conceived or reduced to practice under Contract No. De-AC06-76FF02170 with the U.S. Government.

BACKGROUND OF THE INVENTION

1. Field of the Invention

This invention relates to a method for incoporating "tag" materials within nuclear reactor components in order to readily identify the specific components in the event they fail. In particular, this invention relates to a method for using solid materials which generate tag gases when exposed to radiation in a nuclear reactor.

2. Description of the Prior Art

Nuclear reactor components, particularly fuel elements, are often constructed with gaseous isotopes sealed within the component assembly that are released in the event of a component failure. The gaseous isotopes are selected such that they can be easily detected and identified; thus signaling the failure and identifying, specifically, the failed component.

Reactor fuel elements, also known as fuel rods and fuel pins, are introduced into a nuclear reactor in groups as fuel assemblies, or bundles, with each fuel assembly containing as many as 100 to 400 fuel elements, depending on the size of the reactor. A single reactor may have 100 or more fuel assemblies. Each fuel assembly may be tagged with a particular isotope or a mixture of isotopes in a known ratio. The detection of an isotope or a specific mixture of isotopes signals the failure of one or more fuel elements and identifies the assembly in which the failure occurred.

Four elements may be of two types of construction. They may be vented, wherein gaseous fission products are vented into the liquid reactor coolant and collected in the reactor cover gas, or they may be closed, wherein the gaseous fission products are collected in a gas plenum provided within the sealed fuel element. Tags can only be used with sealed elements.

U.S. Pat. No. 3,663,363, issued to Crouthamel et al., discloses gaseous tags consisting of various mixtures of xenon isotopes having mass numbers less than 131. These tags are added in steel capsules to closed fuel elements with fuel pellets, helium is then added as a heat transfer medium and the elements are sealed. The capsules are then punctured with a device included with each capsule, releasing the tag gas into the sealed element. In the event that an element fails, the gaseous xenon isotope mixture is detected in the reactor cover gas and the location of the failure is determined from the specific ratio of isotopes. Xenon isotopes with mass numbers from 124 and 130 were selected for use as tags as they provided the preferred tag characteristics of not being produced to any significant degree during fission, not having an adverse effect on neutron flux, being unaffected by radiation, being transported to the cover gas with fission product gases, and being easily identified using a mass spectrometer. The preparation of the isotope gas capsules is an exacting and expensive procedure; wherein the gases are mixed in a predetermined ratio, the capsules are placed in a closed chamber, the chamber is evacuated, the tag gas mixture is introduced into the evacuated chamber and, concomitantly, into the capsules, and the capsules are sealed by lazer welding.

In addition to using xenon 124 and 130 isotopes, it is also practical to use isotopes of krypton as tag gases. However, the use of isotopic gas tags is a costly procedure as more and more unique ratios must be used, introducing problems of isotopic enrichment. There are also problems in maintaining tag gas purity during the placement of the isotope mixture into fuel elements and other reactor components.

It is an object of the present invention to provide a method and materials for tagging fuel elements and other reactor components which avoids the mechanical difficulties and high costs encountered in assembling devices which contain gaseous isotopes while maintaining the purity of the tag mixtures.

Additional objectives of the invention are to provide tag materials that are easily handled, that can be used separately or in conjunction with gas tags, that do no result in fission products, and that result in stable end products present in ratios which are different from their relative occurrance in nature.

SUMMARY OF THE INVENTION

This invention relates to the use of solid tag materials in reactor components that generate detectable gaseous tags on being exposed to the neutron flux within a nuclear reactor. Single tag materials and mixtures of tag materials can be used to specifically identify a failed component, based on the constituents and ratio of gases detected and measured.

DESCRIPTION OF THE PREFERRED EMBODIMENTS

Solid materials can be inserted into reactor elements before they are sealed that generate detectable gases on exposure to the neutron flux within a nuclear reactor to signal the occurrence of a leak or failure in the particular element. By using different solid tag materials and mixtures of different materials, particular reactor elements, such as specific tube assemblies, can be identified as being the source of a leak or failure.

Elements such as the halogens, Group VIIA of the periodic table, generate radioisotopes when exposed to a neutron flux. These isotopes undergo beta decay to become noble gases.

Examples of preferred embodiments of the process using halogens as solid tags are:

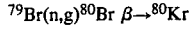  A.

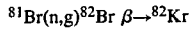  B.

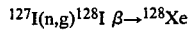  C.

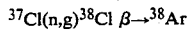  D.

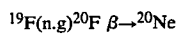  E.

Although any solid material which produces a detectable gas may be used, the preferred embodiments of the invention are limited to those which result in detectable gases that are not produced to any significant degree during reactor operation. That is, materials which result in fission products cannot easily be distinguished from the background material found in the cover gas after a fuel element ruptures. For example, in a sodium cooled reactor, the use of fluorine may not be useful because sodium is also converted to neon. Similarly, $^{127}$I and $^{81}$Br may not be useful in every case as they may also be fission products.

It is possible, however, in another embodiment of the invention, that a tag could be used which is similar to naturally occurring background constituents found in the cover gas as fission products if the background levels are recorded through constant or periodic monitoring. In such an embodiment, a significant departure from a recently measured or anticipated background level would indicate a component failure or leak. A procedure dependent on departures from known background levels used to indicate problems would be particularly useful in situations where there has been some build-up of gaseous isotopes from earlier tagged reactor component failures or other accountable sources.

Gaseous tags are generated from solid materials according to the equation:

Atoms of tag gas $= \phi \sigma N$ where
$\phi =$ neutron flux $\left( \frac{\text{neutrons}}{\text{cm}^2 \times \text{sec}} \right)$ $\sigma =$ cross section (cm$^2$/atom
N = atoms of target material For example, in the reaction of Br to Kr, neglecting bromine depletion, one gram of Br will yield somewhat more than $\frac{1}{3}$ cc (STP) of Kr tag gas in 10 days in a typical liquid metal fast breeder reactor environment.

N = approximately $0.008 \times 10^{24}$ atoms of Br/g $\phi =$ approximately $10^{15}$ neutrons/cm$^2 \times$ sec (typical fast breeder reactor)

$\sigma =$ approximately $10^{-24}$ cm$^2$/atom (typical fast breeder reactor)

Approximately $10^{18}$ atoms of tag gas are generated each day. At STP one cc of Kr$=2.76 \times 10^{19}$ atoms. Therefore, approximately 0.37 cc of Kr at STP are generated from 1 g. Br in 10 days in this example.

Although the above example is based on characteristics of fast breeder reactors, the generation rate of isotopic tag gases in a typical thermal reactor would be on the same order of magnitude. Although the neutron flux may be 10 to 50 fold smaller in a thermal reactor, its cross section would be larger by the same factor. Hence, the present invention may be used equally well in a thermal reactor.

The production of detectable gaseous isotopes is linear with time, which is evident from the above equation. Starting with, for example, one gram Br, approximately 0.037 cc (STP) Br will be generated on the first day, and on every day thereafter. A leak in a reactor component will be detected within a fraction of the first day based on the use of one gram amounts of a tag material. Early detection can be assured, of course, by using slightly greater quantities of the tag material.

The preferred method for testing the cover gas for tag gas is with a mass spectrometer. Conventionally, the cover gas is monitored by continuously passing a sample through a device for detecting fission products, i.e., radioactivity. When fission products are detected, a sample is assayed with a mass spectrometer to identify the isotope and determine the isotopic ratio. A mass spectrometer identifies identically charged ions having different masses by measuring differences in their deflection in electrical and magnetic fields. The quantity of gas generated from one gram of solid tag material in 10 days is easily detected.

Detection of lesser concentrations can be enhanced using cryogenic techniques and concentrating the tag gas in an activated charcoal filter. Using a mass spectrometer with these methods, very small amounts of tag gases, present in amounts as low as $10^{-11}$, can be detected, identified, and accurately measured; thus enabling the early detection of a leak or component failure and identifying the source of the problem. In a typical reactor, a one gram amount of solid tag materials should generate sufficient isotopic tag gases to be detectable in the cover gas within a few hours.

Requirements of a tag material, in addition to being detectable and measurable in contrast to the background, include the characteristics of not affecting the neutron flux adversely, not being further changed from the identifiable product on continued exposure to radiation, and not being significantly soluble in the reactor coolant.

The solid tag materials of the present invention may be used in conjunction with the gas tags used in the prior art, if necessary, to obtain a greater variety of isotopic ratios. Moreover, failures which occur at the time a fuel assembly or other tagged reactor component is placed into the reactor would be signalled by the immediate detection of the gaseous tag. The solid tag alone requires a finite time to generate sufficient gaseous isotopes to be detected.

The solid tag materials may be introduced as a salt of the desired element. For example, the sodium, potassium, calcium, iron or nickel salts of a halogen isotope tags. The salts may be introduced in the form of pellets or as powder or granules in containers which are fairly non-reactive in the fuel rod environment.

The tag salts selected must consist of predetermined ratios of particular isotopes. For example, salts consisting of known ratios of $^{79}$Br$^-$ and $^{81}$Br$^-$ may be used to generate the tag gases comprising known ratios of $^{80}$Kr and $^{82}$Kr. Even though the element is in the form of an ion in the salt, it will be transmuted in the neutron flux to the noble gas.

Similarly, salts having particular proportions of $^{35}$Cl and $^{37}$Cl will generate $^{36}$Ar and $^{38}$Ar in unique ratios quite different from the ratio of these isotopes found in natural argon. Mixtures of different elements may also be employed to establish unique tags. The same isotopic ratios of chloride could be used with or without iodine salts to double the number of different tags available.

Any cation component may be used in the solid salt used for tagging as it is irrelevant to generating the isotopic gas. The commonly available sodium, potassium, or calcium salts may be used. Also, ion salts and similar salts of metals which are fairly unreactive in their elemental form may be preferred in some applications.

The invention provides a method for tagging reactor components with solid salts that are inexpensive to use and are easily handled. It is believed that the cost of tagging reactor components will be reduced one hundred fold using these salts. Moreover, as the isotopic salts are stable, the solid tags can be produced on a large scale and inventoried at a central facility, then shipped to reactor sites as needed. In addition, as physically small amounts of solid salts quickly generate measurable quantities of isotopic gas, units of different salts can be combined at the reactor site as required to obtain a variety of different gaseous isotope ratios.

The above embodiments are presented as examples to illustrate the invention without intending to limit the invention thereby. It will be understood that the present description is susceptible to various modifications, changes, and adaptations within the invention defined by the following claims.

What is claimed is:

1. A solid tag material for identifying a nuclear reactor component when placed within the component; comprising solid materials which contain at least one non-gaseous element that undergoes nuclear transmutation into one or more detectable, identifiable, and measurable tag gases on irradiation in a nuclear reactor; wherein the tag gases generated are stable, are not fission products, and are generated in predetermined proportions different from their natural occurrence; whereby on the failure of a component the tag gases can be detected in the reactor cover gas and the failed component identified according to the tag gas composition.

2. A solid tag material as recited in claim 1, comprising one or more solid materials, containing an element or a salt thereof selected from the group consisting of bromine, iodine, chlorine, and flourine.

3. A solid tag material as recited in claim 2, comprising one or more solid materials containing an element or a salt thereof selected from the group consisting of $^{127}$I, $^{81}$Br, $^{79}$Br, $^{37}$Cl, $^{35}$Cl and $^{19}$F.

4. A solid tag material as recited in claim 1, wherein the detectable tag gases generated comprise one or more noble gases.

5. A solid tag material as recited in claim 4, wherein the detectable tag gases generated comprise one or more noble gases selected from the group consisting of $^{128}$Xe, $^{82}$Kr, $^{80}$Kr, $^{38}$Ar, $^{36}$Ar and $^{20}$Ne.

6. A method for tagging a nuclear reactor component; comprising sealing into the reactor component the solid tag material recited in claim 1 comprising one or more solid materials which generate detectable gaseous isotopes on irradiation in a nuclear reactor, whereby the gaseous isotopes generated are released on the component's failure, pass to the reactor cover gas, and are there detected.

7. The method recited in claim 6, wherein different solid tag materials which generate different isotopic gases in a nuclear reactor are sealed into different reactor components; whereby on the failure of a reactor component it can be identified from the specific gaseous isotope or the ratio of gaseous isotopes detected.

8. The method recited in claim 6, wherein in addition to the solid tag materials, gaseous tag materials are sealed into the reactor components.

9. A method for signaling the failure of a nuclear reactor component and identifying the failed component; comprising tagging the component according to the method of claim 7, detecting the presence of the gaseous isotopes in the cover gas, and identifying the constituents and relative proportions of the gaseous isotopes.

10. The method recited in claim 9, wherein after detection, the composition and relative quantities of tag gases are measured using a mass spectrometer.

11. The method recited in claim 9, wherein failure of a component is signaled by detecting the presence of gaseous isotopes different in composition or quantity from a predetermined background level.

12. A fuel element having sealed therein the solid tag material defined in claim 1.

13. A fuel element having sealed therein the solid tag material defined in claim 2.

14. A fuel element having sealed therein the solid tag material defined in claim 3.

15. A nuclear reactor comprising components which have sealed therein the solid tag material defined in claim 1.

16. A nuclear reactor comprising components which have sealed therein the solid tag material defined in claim 2.

17. A nuclear reactor comprising components which have sealed therein the solid tag material defined in claim 3.

18. In a nuclear reactor having fuel in a gas-sealed compartment, an improved material for generating a tag gas which can be used to identify said compartment if gases escape therefrom, said material comprising a solid which contains at least one halogen in a non-gaseous form which will undergo nuclear transformation within said reactor into detectable, identifiable, and measurable noble tag gases.

* * * * *